United States Patent
Johnson et al.

(10) Patent No.: US 7,408,328 B2
(45) Date of Patent: Aug. 5, 2008

(54) INFORMATION HANDLING SYSTEM INCLUDING A POWER SUPPLY UNIT WITH A SWITCHING REGULATOR THAT REDUCES TRANSIENT LOAD RELEASE

(75) Inventors: Brian Patrick Johnson, Cedar Park, TX (US); Brent Alan McDonald, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 95 days.

(21) Appl. No.: 11/195,505

(22) Filed: Aug. 2, 2005

(65) Prior Publication Data
US 2007/0029981 A1 Feb. 8, 2007

(51) Int. Cl.
*G05F 1/00* (2006.01)
(52) U.S. Cl. ............... 323/222; 323/222; 323/282; 323/284; 323/287
(58) Field of Classification Search ............... 323/222, 323/282, 284, 287
See application file for complete search history.

(56) References Cited
U.S. PATENT DOCUMENTS

| | | | | |
|---|---|---|---|---|
| 5,402,329 | A * | 3/1995 | Wittenbreder, Jr. ........... | 363/16 |
| 5,680,300 | A * | 10/1997 | Szepesi et al. ............... | 363/59 |
| 6,356,059 | B1 * | 3/2002 | Yu ............... | 323/223 |
| 6,549,432 | B1 * | 4/2003 | Giannopoulos et al. .. | 363/21.14 |
| 6,804,091 | B2 | 10/2004 | Jenkins et al. | |
| 6,989,997 | B2 * | 1/2006 | Xu et al. ............... | 363/16 |
| 7,098,639 | B2 * | 8/2006 | Natsume et al. ............... | 323/282 |
| 2006/0087295 | A1 * | 4/2006 | Jang et al. ............... | 323/222 |

OTHER PUBLICATIONS

Maxim Integrated Products, Datasheets for MAX8506-MAX8508, MAXIM, Jan. 2004, Rev1, p. 1-11.*

* cited by examiner

*Primary Examiner*—Baq Q. Vu
*Assistant Examiner*—Jue Zhang
(74) *Attorney, Agent, or Firm*—Haynes and Boone, LLP

(57) ABSTRACT

An information handling system ("IHS") includes a system board and a power supply unit coupled to the system board. The power supply unit includes a switching power regulator. The switching power regulator includes an inductor coupled to an output, a capacitor coupled to the inductor, a switch, coupled to the inductor, for regulating power supplied by the power supply unit in response to a duty cycle, and a control circuit, coupled to the switch, for supplying current to the inductor while the switch is closed and charging the capacitor while the switch is open.

14 Claims, 2 Drawing Sheets

INFORMATION HANDLING SYSTEM INCLUDING A POWER SUPPLY UNIT WITH A SWITCHING REGULATOR THAT REDUCES TRANSIENT LOAD RELEASE

BACKGROUND

The description herein relates generally to information handling systems ("IHSs") and more particularly to an IHS that includes a power supply unit with a switching regulator that reduces transient load release.

As the value and use of information continues to increase, individuals and businesses seek additional ways to process and store information. One option is an information handling system ("IHS"). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

An IHS typically includes a power supply unit for supplying regulated power to its various components. In one example, a power supply unit includes a switching regulator for regulating power supplied via a power converter.

Such power supply unit including a switching regulator may cause various problems in an IHS. For example, in a situation whereby a load level (e.g., as demanded by a component being powered) of the power supply transitions relatively quickly from a relatively high load (e.g., close to maximum load) to a relatively low load (e.g., close to a minimum load), the IHS may be subject to a load step transient. In such situation voltage level of the switching regulator may rise rapidly because of energy stored in the regulator's output inductor. Such rise in voltage level may damage the IHS.

What is needed is a method and an IHS that includes a power supply unit with a switching regulator, without the disadvantages discussed above.

SUMMARY

Accordingly, a method of operating a power supply unit including a switching power regulator including an inductor coupled to an output, a capacitor coupled to the inductor, and a switch, coupled to the inductor, for regulating power supplied by the power supply unit in response to a duty cycle is provided. The method includes supplying current to the inductor while the switch is closed and charging the capacitor while the switch is open.

DETAILED DESCRIPTION

For purposes of this disclosure, an information handling system ("IHS") may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a network server or storage device, a switch router or other network communication device, or any other suitable device and may vary in size, shape, performance, functionality, and price. The IHS may include memory, one or more processing resources such as a central processing unit ("CPU") or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
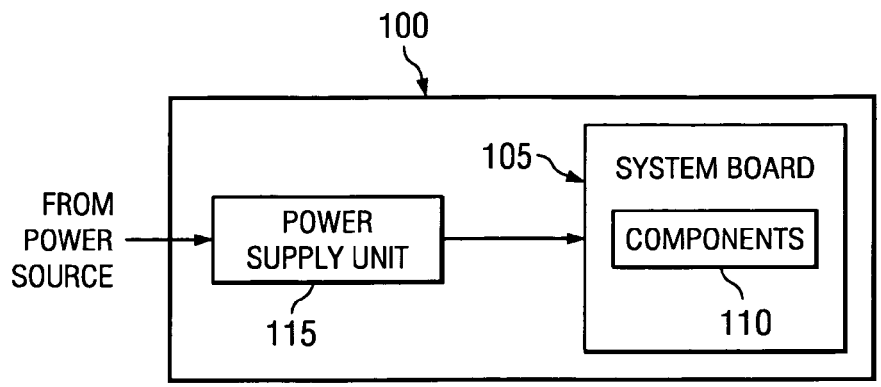
FIG. 1 is a block diagram of an information handling system ("IHS") according to one embodiment.

FIG. 1 is a block diagram of an IHS, indicated generally at 100 according to an illustrative embodiment. The IHS 100 includes a system board 105. The system board 105 includes components (e.g., various devices such as memory devices) 110. Examples of the components 110 are discussed in more detail below in connection with FIG. 2.

The IHS 100 also includes a power supply unit 115 coupled to the system board 115. The power supply unit 115 receives power from a power source, as depicted in FIG. 1, and supplies power to the various components 110 of the system board 105. The power supply unit 115 is discussed in more detail below in connection with FIG. 3.

Figure 2:
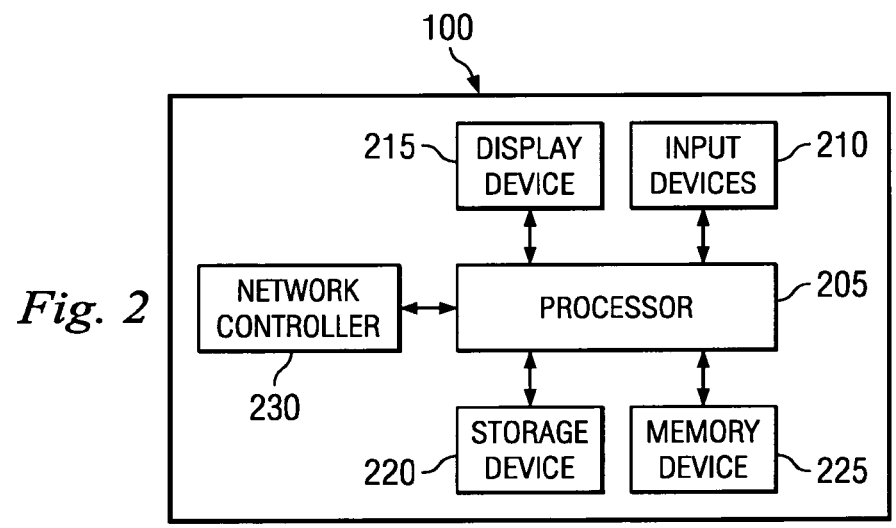
FIG. 2. is a more detailed block diagram of the IHS of FIG. 1.

FIG. 2 is a more detailed block diagram of the IHS 100. The IHS 100 includes a processor 205 (e.g., an Intel Pentium series processor) for executing and otherwise processing instructions, input devices 210 for receiving information from a human user, a display device 215 (e.g., a cathode ray tube ("CRT") device, a projector, a liquid crystal display ("LCD") device, or a plasma display device) for displaying information to the user, a storage device 220 (e.g., a non-volatile storage device such as a hard disk drive or other computer readable medium or apparatus) for storing information, a memory device 225 (e.g., random access memory ("RAM") module and read only memory ("ROM") modules), also for storing information, and a network controller 230 for communicating between the IHS 100 and a network. Examples of the memory device 225 include single in-line memory modules ("SIMMS") and double in-line memory modules ("DIMMS") such as fully-buffered DIMMs ("FB-DIMMs").

Each of the input devices 210, the display device 215, the storage device 220, the memory device 225, and the network controller 230 is coupled to the processor 205, and to one another. Also, in one example, the IHS 100 includes various other electronic circuitry for performing other operations of the IHS 100, such as a print device (e.g., a ink-jet printer or a laser printer) for printing visual images on paper.

The input devices 210 include, for example, a conventional keyboard and a pointing device (e.g., a "mouse", a roller ball, or a light pen). A user operates the keyboard to input alpha-numeric text information to the processor 205, and the processor receives such information from the keyboard. A user also operates the pointing device to input cursor-control information to the processor 205, and the processor 205 receives such cursor-control information from the pointing device.

As discussed above, the power supply unit 115 including a switching regulator may cause problems in the IHS 100 associated with load step transient. For example, in a situation whereby a load level (e.g., as demanded by a component being powered) of the power supply transitions relatively quickly from a relatively high load (e.g., close to maximum load) to a relatively low load (e.g., close to a minimum load), the IHS is the cause of a load step transient. In such situation, voltage level of the switching regulator may rise rapidly because of energy stored in the regulator's output inductor and subsequent interaction with the output capacitance. Such rise in voltage level may damage the IHS 100 or cause it to malfunction (e.g., the various components of the IHS 100).

In the illustrative embodiment, the power supply unit includes a switching regulator which forms a relatively large voltage discrepancy (e.g., "voltage drop") across its output inductor. Accordingly, the output inductor of the switching regulator is capable of discharging its stored energy relatively quickly.

Figure 3:
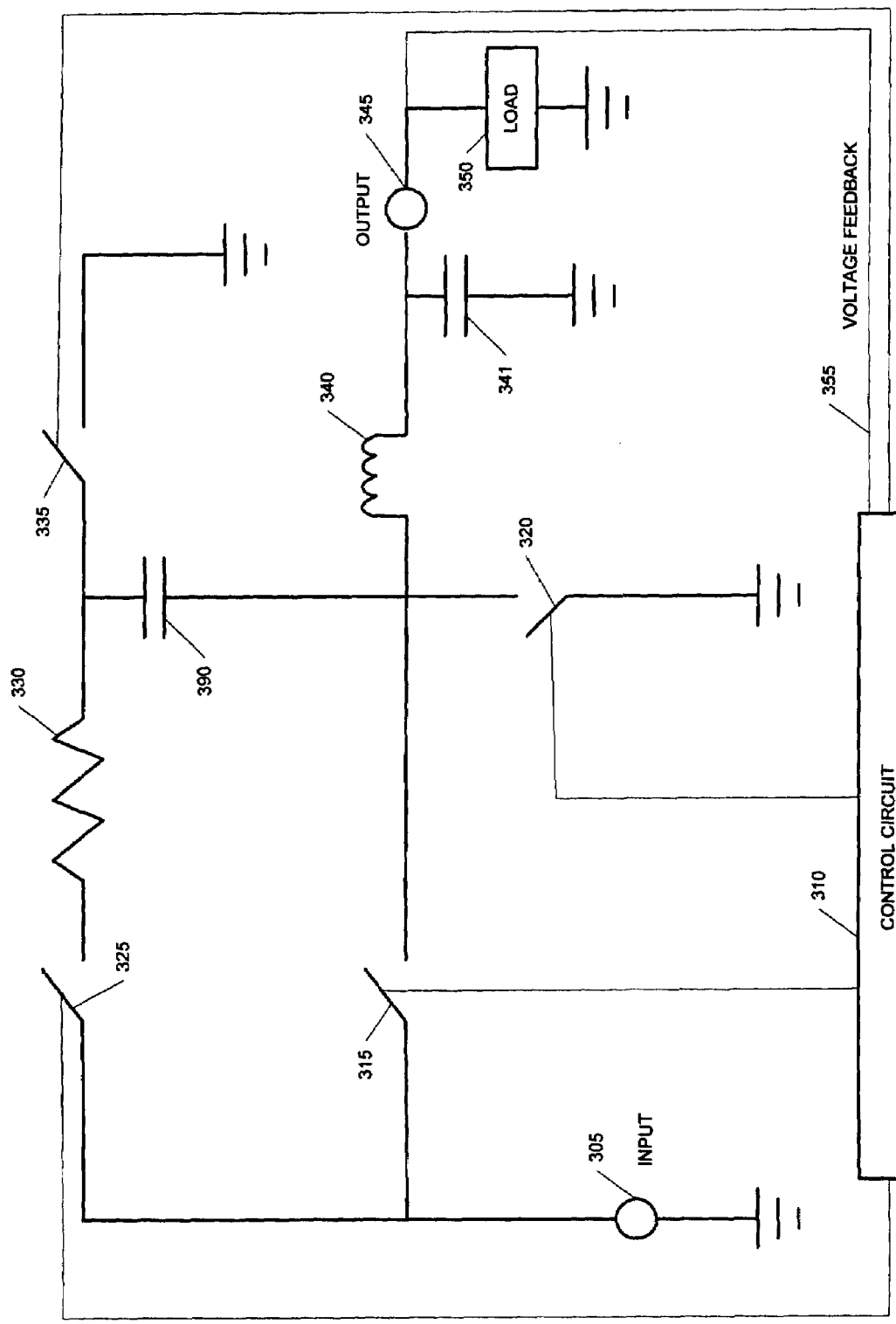
FIG. 3 is a circuit diagram of a switching regulator, according to one embodiment.

FIG. 3 is a circuit diagram of a switching regulator, indicated generally at 300, included in the power supply unit 115 of FIG. 1. The switching regulator 300 includes an input 305, a control circuit 310, a switch 315, a switch 320, a switch 325, a resistor 330, a switch 335, a capacitor 390, an output inductor 340, an output 345, a load 350, and a voltage feedback line 355. A capacitor 341 is connected to ground between inductor 340 and output 345. In the illustrative embodiment, switches 320 and 325 must be capable of blocking voltage in both directions. Switches 315 and 335 need to be able to block voltage in one direction, e.g. MOSFETS, but can be capable of blocking voltage in both directions, e.g. JFETS.

The switching regulator 300 is a DC to DC, synchronous, buck type, switching regulator. Accordingly, the input 305 is coupled to receive current from a DC power source (not shown) such as, for example, a battery or a AC/DC rectifier.

In a switching operation, the control circuit repeatedly opens and closes the switches 315 and 320 according to a duty cycle to provide current to the load 350 via the output inductor 340 and the output 345. Accordingly, the control circuit 310 is coupled to the switches 315, 320, 325 and 335.

For increasing voltage drop across the output inductor 340, the switching regulator 300 charges the capacitor 390 during normal switching. More particularly, during periods of the duty cycle in which the control circuit 310 turns off the switch 315, the control circuit 310 turns on the switches 320 and 325.

By comparison, during periods of the duty cycle in which the control circuit turns on the switch 315, the control circuit 310 turns off the switches 320 and 325. Accordingly, during such periods, the switching circuit 300 supplies current to the output 345.

The control circuit receives an indication of level of voltage at the output 345 via the voltage feedback line 355. A rising voltage level at the output 345 potentially indicates that the load 350's demand is becoming lower, thereby also indicating the potential for transient load release. Accordingly, in response to detecting a rise (e.g., a rise by a predetermined amount) in voltage level at the output 345, the control circuit performs an operation to maintain the output voltage.

As discussed above, the switching circuit 300 charges the capacitor 390 during normal switching operation. Thus, voltage drop across the output inductor 340 is potentially increased. Accordingly, in response to detecting a rise in voltage level at the output 345, the control circuit 310 opens the switches 315, 320, and 325. Also in response to detecting such rise, the control circuit 310 closes the switch 335, thereby increasing a negative voltage across the output inductor 340. In response to the control circuit opening the switches 315, 320, and 325 and closing the switch 335, the output inductor 340 discharges its energy into the capacitor 390 thereby maintaining the output voltage.

With regard to the resistor 330, the purpose is to limit current through input 305, switch 325, capacitor 390 and switch 320. Therefore, this could also be accomplished by the parasitic resistance in one or more of the above-mentioned components, by the resistor 330, or by the variable gate drive of the switch 325.

Although illustrative embodiments have been shown and described, a wide range of modification, change and substitution is contemplated in the foregoing disclosure. Also, in some instances, some features of the embodiments may be employed without a corresponding use of other features. Accordingly, it is appropriate that the appended claims be constructed broadly and in manner consistent with the scope of the embodiments disclosed herein.

What is claimed is:

1. A power supply unit comprising:
a switching power regulator comprising:
an output electrically coupled to a first side of an inductor, wherein the output is electrically coupled to a load;
a capacitor electrically coupled to a second side of the inductor, wherein the second side is opposite the first side; and
a controller to reverse a direction of a flow of current through the inductor and discharge energy from the inductor to the capacitor in response to detecting that a voltage level at the output is rising, wherein the controller comprises:
a first switch electrically coupled to the inductor and a voltage input;
a second switch electrically coupled to the voltage input and the capacitor;
a third switch electrically coupled to the capacitor, the inductor and ground;
a fourth switch electrically coupled to the capacitor and ground; and
a control circuit electrically coupled to the output, the first switch, the second switch, the third switch, and the fourth switch, wherein the capacitor is charged during periods of the duty cycle in which the first switch is open, the second switch is closed, the third switch is closed, and the fourth switch is open.

2. The power supply unit of claims 1, wherein discharging energy stored in the inductor to the capacitor comprises:
opening the first switch, the second switch, and the third switch and closing the fourth switch.

3. The power supply unit of claim 2, wherein one or more of the switches is a junction field effect transistor ("JFET"), and one or more of the switches is a metal oxide semiconductor field effect transistor ("MOSFET").

4. The power supply unit of claim 1, wherein the capacitor is any suitable capacitor.

5. The power supply unit of claim 1, wherein the switching regulator is a buck type of switching regulator.

6. An information handling system ("IHS") comprising:
a system board; and
a power supply unit electrically coupled to the system board comprising:
a switching power regulator comprising:

an output electrically coupled to a first side of an inductor, wherein the output is electrically coupled to the system board;

a capacitor electrically coupled to a second side of the inductor, wherein the second side is opposite the first side; and a controller to reverse a direction of a flow of current through the inductor and discharge energy from the inductor to the capacitor in response to detecting that a voltage level at the output is rising, wherein the controller comprises:

a first switch electrically coupled to the inductor and a voltage input;

a second switch electrically coupled to the voltage input and the capacitor;

a third switch electrically coupled to the capacitor, the inductor and ground;

a fourth switch electrically coupled to the capacitor and ground; and a control circuit electrically coupled to the output, the first switch, the second switch, the third switch, and the fourth switch, wherein the capacitor is charged during periods of the duty cycle in which the first switch is open, the second switch is closed, the third switch is closed, and the fourth switch is open.

7. The IHS of claim 6, wherein discharging energy stored in the inductor to the capacitor comprises:

opening the first switch, the second switch, and the third switch and closing the fourth switch.

8. The IHS of claim 7, wherein one or more of the switches is a junction field effect transistor ("JFET"), and one or more of the switches is a metal oxide semiconductor field effect transistor ("MOSFET").

9. The IHS of claim 6, wherein the capacitor is any suitable capacitor.

10. The IHS of claim 6, wherein the switching regulator is a buck type of switching regulator.

11. A method comprising:

detecting whether a voltage level at an output is rising;

reversing a direction of a flow of current through an inductor; and discharging energy from the inductor to a capacitor in response to detecting that the voltage level at the output is rising, wherein a switching power regulator includes the output, the inductor, and the capacitor, wherein the output is electrically coupled to a first side of the inductor, wherein the output is electrically coupled to a load, wherein the capacitor is electrically coupled to a second side of the inductor, wherein the second side is opposite the first side, wherein a power supply unit includes the switching power regulator and a controller, and wherein the controller regulates power supplied by the power supply unit, wherein the controller comprises:

a first switch electrically coupled to the inductor and a voltage input;

a second switch electrically coupled to the voltage input and the capacitor;

a third switch electrically coupled to the capacitor, the inductor and ground;

a fourth switch electrically coupled to the capacitor and ground; and a control circuit electrically coupled to the output, the first switch, the second switch, the third switch, and the fourth switch, wherein the capacitor is charged during periods of the duty cycle in which the first switch is open, the second switch is closed, the third switch is closed, and the fourth switch is open.

12. The method of claim 11, wherein discharging energy stored in the inductor to the capacitor comprises:

opening the first switch, the second switch, and the third switch and closing the fourth switch.

13. The method of claim 12, wherein one or more of the switches is a junction field effect transistor ("JFET"), and one or more of the switches is a metal oxide semiconductor field effect transistor ("MOSFET").

14. The method of claim 13, wherein the capacitor is any suitable capacitor.

* * * * *

UNITED STATES PATENT AND TRADEMARK OFFICE
CERTIFICATE OF CORRECTION

| | |
|---|---|
| PATENT NO. | : 7,408,328 B2 |
| APPLICATION NO. | : 11/195505 |
| DATED | : August 5, 2008 |
| INVENTOR(S) | : Brian Patrick Johnson et al. |

It is certified that error appears in the above-identified patent and that said Letters Patent is hereby corrected as shown below:

Claim 2; Column 4; Line 50, delete "claims" and insert --claim--.

Signed and Sealed this

Fourteenth Day of April, 2009

JOHN DOLL
*Acting Director of the United States Patent and Trademark Office*